Patented Jan. 10, 1928.

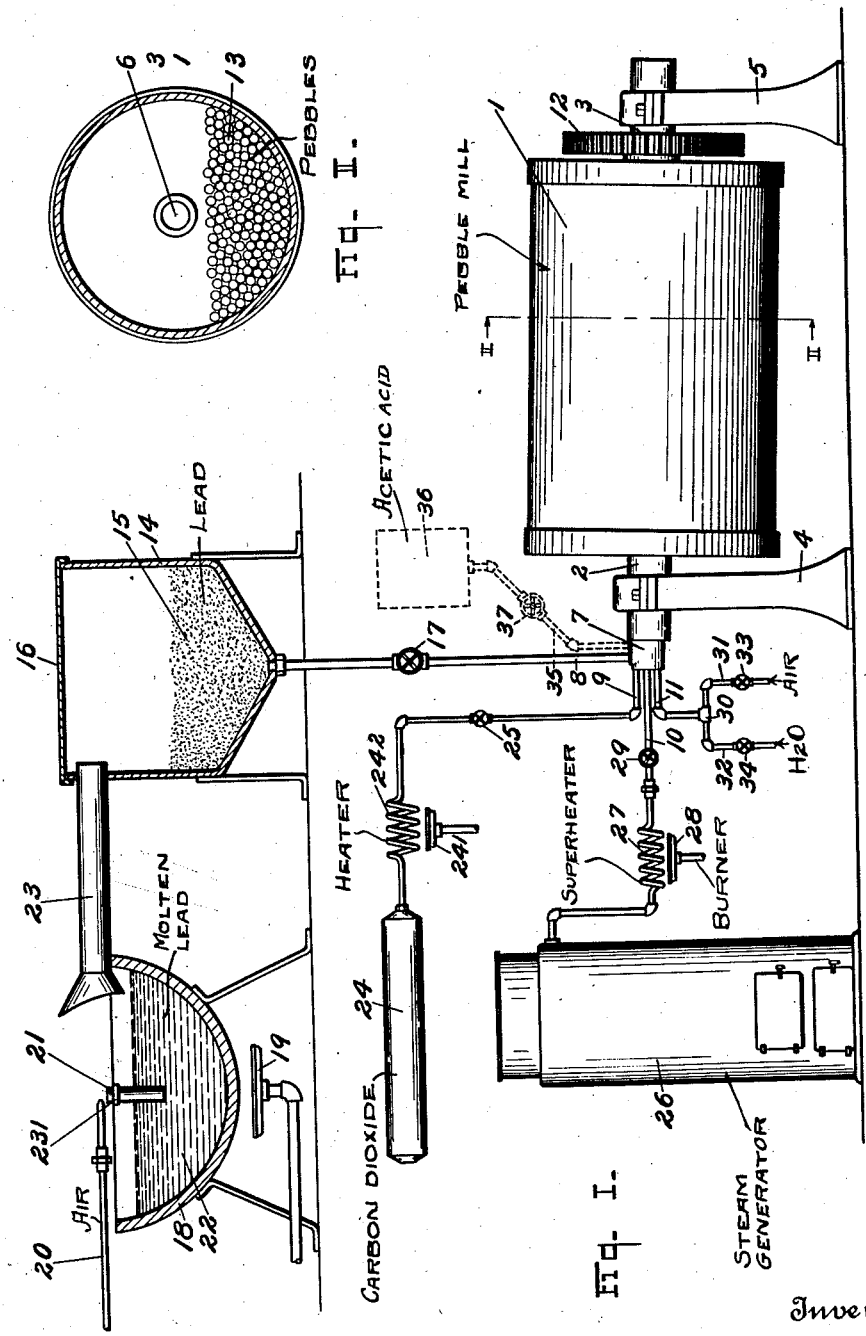

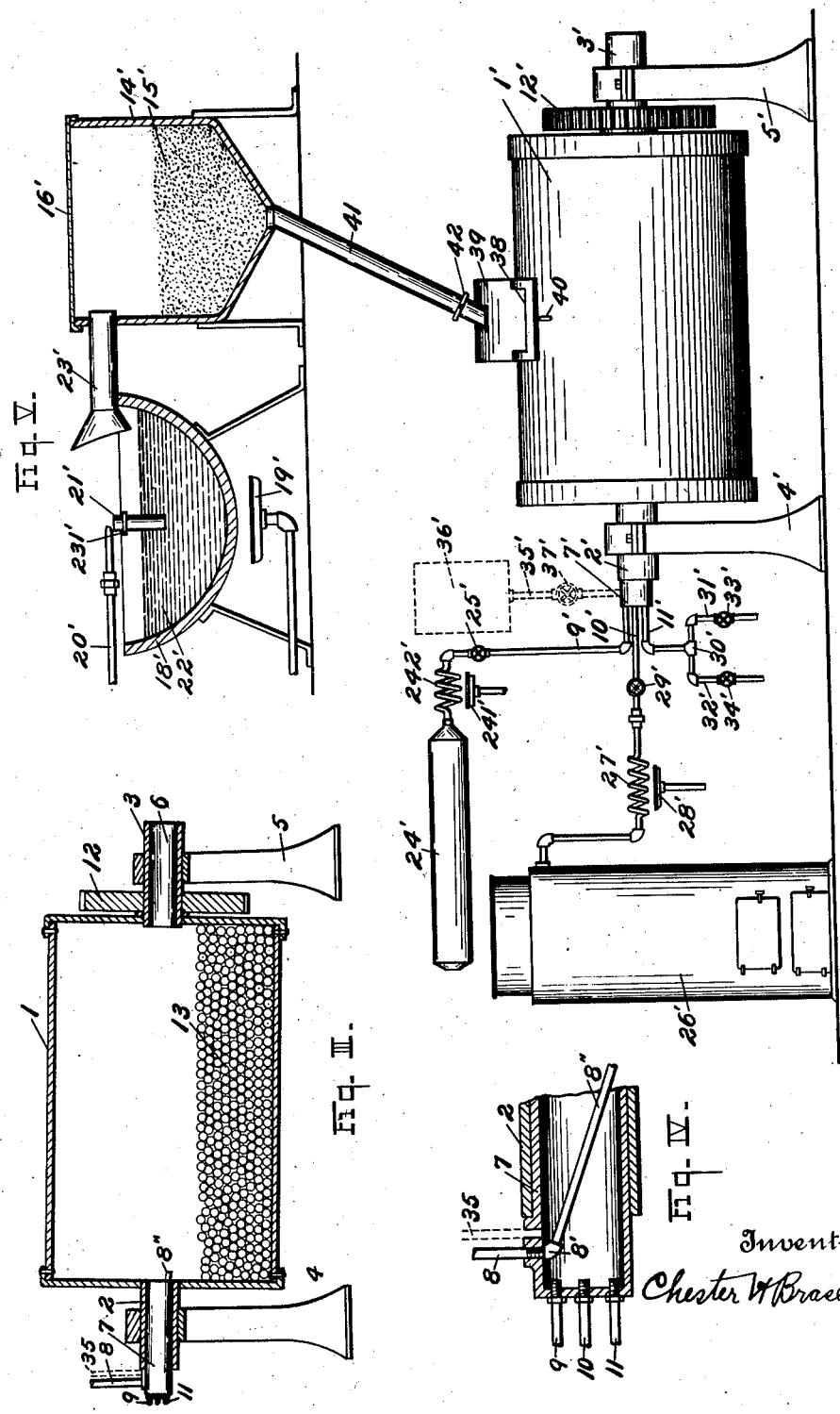

1,655,723

UNITED STATES PATENT OFFICE.

CHESTER H. BRASELTON, OF TOLEDO, OHIO.

METHOD OF PRODUCING WHITE LEAD.

Application filed April 1, 1919. Serial No. 286,639.

This invention relates to a process of producing white lead, and among the objects therefor, I have in mind, together with the production of a much better grade and quality of white lead than that now on the market, the further objects of being able to produce such white lead cheaper and by a method requiring less time than is required by known processes.
Together with the accomplishments of the above objects, I also accomplish in a practical manner, a continuous method of producing white lead by which practically constant feed of the materials going into the manufacture of white lead takes place in the apparatus, and automatically the completed product is fed from the machine after treatment.

In the drawings, Figure I is an illustrative view showing my method and apparatus for manufacturing white lead by a continuous operation.

Figure II is a cross section taken on the line II—II of Figure I looking in the direction of the arrows.

Figure III is a longitudinal vertical section through the tumbling barrel shown in Figure I.

Figure IV is a detail view showing the inlet tube and supply pipes connected thereto for feeding the materials entering into the manufacture of white lead into the tumbling barrel.

Figure V is a view showing illustratively the method of producing white lead by my process, in which the white lead is produced in batches rather than by a continuous process.

In the drawings, 1 is a tumbling barrel having trunnions 2 and 3 supported in bearings at the upper end of standards 4 and 5. The trunnions 2 and 3 are hollow as shown at 6 in Figure II, providing inlets and outlets to and from the side of the tumbling barrel.

A tube 7, closed at one end except where it receives feed pipes 8, 9, 10 and 11, fits into the inside of trunnion 2, preferably in a substantially air tight manner so that trunnion 2, with the tumbling barrel 1, may rotate around the tube 7, the latter remaining stationary.

Trunnion 3 carries a gear 12 which may be connected to any suitable source of power, whereby through the gear 12 and trunnion 3, the tumbling barrel may be rotated about its axis.

Inside the tumbling barrel, I place a quantity of pebbles shown at 13 in Figure II, of any suitable material, such as quartz, for example, that will serve as pulverizing means for material in the tumbling barrel, and not be injuriously affected by the material and gases with which they are in contact, yet sufficiently durable to not become unduly damaged and broken in use.

Of the pipes leading into the end of the tube 7, pipe 8 is a feed pipe for powdered lead, the upper end of this pipe leading to a bin 14 containing powdered lead 15. The bin has a lid 16 at the top as a closure. 17 is a valve for closing the pipe 8 to prevent passage of the powdered lead down through the pipe or tube 7, or for partially closing or opening the pipe to such flow so as to regulate the amount of powdered lead flowing through the pipe into the tube 7 and eventually into the tumbling barrel. The lower end of pipe 8 is connected by a coupling 8' to a pipe 8'' which carries the powdered lead downwardly and inwardly of the tube 7 so as to discharge the powdered lead inside of the inner end of the tube 7 so that it will drop directly into the inside of the tumbling barrel 1.

The powdered lead 15 in the bin 14 may be produced by melting lead in the crucible 18 by means of a heater 19 thereunder, and then by air forced through a pipe 20 immediately across the top of a tube 21 which projects down into the molten lead 22 in the crucible 18, the molten lead is drawn up to the top of the tube 21 and atomized by the air coming out of pipe 20 and blown into a dust through the funnel and pipe 23, one end of which opens into the bin 14, into the inside of said bin, where it falls down to the bottom of same as powdered lead. The tube 21 is supported by a bracket 231 projecting from one side of the crucible 18 as shown in Figure I. The powdered lead may of course be powdered in any other manner or purchased on the market for supplying the powdered lead for the bin 14.

The pipe 9 leading into the tube 7 leads to a tank 24 containing carbon-dioxide, or may lead to any other source of supply for carbon-dioxide. The valve 25 is used to either close pipe 9 to prevent passage of carbon-dioxide from the supply tank 24 to the tube 7, or to partially open or close such pipe to control the amount of carbon-dioxide passing from the source of supply down to the tube 7, and eventually to the tumbling barrel. A heater 241 may be placed under a coil 242 in the pipe 9 so as to warm or heat the carbon-dioxide flowing through the pipe 9 to the tumbling barrel if desired.

The pipe 10 opening into the tube 7 leads to a steam boiler 26, on the inside of which is a furnace for heating the water in the boiler so as to provide a supply of steam. The pipe 10 has a coiled portion 27 above a heater 28, so that steam passing through this coiled portion may be heated to a superheated state while passing from the steam boiler 26 into the tube 7, and eventually into the tumbling barrel. A valve 29 is provided for shutting off completely, the supply of steam to the tube 7 and tumbling barrel, or for partially opening or closing the pipe to the passage of steam so as to control the amount of steam flowing from the steam boiler into the tumbling barrel.

The pipe 11 leads down to a point 30 where it connects with two pipes 31 and 32, the former of which leads to a supply of air under pressure, and the latter of which leads to a source of water supply under pressure. Valves 33 and 34 are provided for completely shutting off either or both the supply of air or the supply of water allowed to enter the pipe 11 and eventually the tumbling barrel, as these valves may be opened or closed to any degree independently. I do not find it necessary, however, to use the water and air supply, but I provide these supplies in my apparatus so that addition of water and air may be made if desirable to hasten or alter the process.

Another pipe 35 is shown in dotted lines leading to a tank 36 containing a solution of acetic acid, the pipe having a valve 37 for shutting off the supply of acetic acid or controlling the amount supplied to the tube 7, thus providing for a source of supply of acetic acid for use in the process, should this be desired for any reason. I prefer, however, to carry out my process without resorting, however, to the use of acetic acid solution in the process, but small quantities of this may be used if particularly desired, though not necessary.

The standard 5 for supporting the trunnion 3 is shorter than the standard 4 supporting the trunnion 2, with the result that the tumbling barrel 1 does not stand parallel, but has its right hand end in Figure I lower than in the left hand end.

The operation of the apparatus shown in Figures I, II, III and IV just described is as follows:

Powdered lead from the bin 14 is either continuously or intermittently, as desired, fed through the pipe 8 downwardly through the pipe 8″ being discharged at the inner end of the latter pipe so as to drop into the inside of the tumbling barrel 1. At the same time carbon-dioxide from the tank 24, or any other suitable source of supply, is fed under pressure through the pipe 9 into the inside of the tube 7, which is in communication with the inside of the tumbling barrel 1. The carbon-dioxide may be heated by the burner 241 at the coil 242 as it passes through the pipe 9 if found desirable. At the same time steam is fed from the steam boiler 26 through the pipe 10 into the inside of the tube 7, which is in communication with the inside of the tumbling barrel 1, the steam preferably being superheated at the coil 27 by the burner 28 so that the steam will reach the inside of the tumbling barrel in a superheated state. Through the pipe 11 a mixture of water and air, or either, may, if found desirable, be fed into the inside of the tube 7 and the inside of the tumbling barrel in whatever proportion is desired as controlled by the valves 33 and 34, one controlling the passage to the air supply and the other controlling the passage to the water supply. It is understood, however, that either or both supplies of water or air may be shut off by the valves 33 and 34 to any degree in case it is not desired to add any water or air respectively to the inside of the tumbling barrel other than what would be there in the normal operation of the apparatus without these. A certain amount of water would be produced by the condensation of the steam and as there would always be some air present in the form shown inside the tumbling barrel, as the inside is open to the atmosphere in this continuous process through the hollow opening in the trunnion 3. Then too, it is not absolutely necessary in the operation of my apparatus that aside from this opening 3 the inside of the tumbling barrel be absolutely air tight from the atmosphere. As stated above, the acetic acid solution may be fed into the inside of the tumbling barrel from the tank 36 and through the pipe 35 controlled by valve 37, if it is desired to add a little acetic acid solution to hasten the carrying out of my method.

At the same time that the powdered lead, carbon-dioxide and superheated steam, and if desired the acetic acid, water and air is fed through the tube 7 into the inside of the tumbling barrel which contains the quantity of pebbles 13, the tumbling barrel as a whole is rotated by any suitable sources of power driving the gear 12, with the result that while the carbon-dioxide and superheated steam, as well as, if used, the acetic acid solution, air and water, is acting upon the powdered lead in the inside of the tumbling barrel to form white lead, the pebbles inside of the pebble mill, as the latter is rotated, serve to continuously grind the powdered lead as well as the white lead that is being formed while the chemical action is taking place. It will be apparent that by the use of the pebble mill while the chemical action is taking place the pebbles will serve to continuously break from the tiny particles of lead any crust of white lead or other compound which would be constantly being formed around the individual particles of lead, and break away such crust so as to allow the lead which would otherwise be incrusted within the crust formed by chemical action around each particle to be accessible to the carbon-dioxide, steam and other gases and liquids if present, so that the chemical action may proceed between the lead in the interior of each tiny particle and the surrounding gases and liquids. That is, by the action of the pebble mill on the lead as it is being transformed into white lead the latter will be constantly broken away from the particles of lead from which it is formed so as to allow the gases and liquids to have ready access to the pure lead in the interior of each particle at all times. This also results in the white lead formed being much more thoroughly powdered and being composed of finer particles, thus resulting in a better grade of white lead being produced as well as the forming of a product of much more uniform nature throughout.

As the white lead is formed, it will gradually work forward to the lower or discharge end of the pebble mill and will eventually be discharged through the opening 6 in the trunnion 3 from the outer end of which it will drop into any suitable vessel arranged to receive it. The supply of ingredients entering into the manufacture of the white lead being constantly supplied at the other end of the tumbling barrel and the process going on continuously there will result a continuous mill for the production of white lead in which the lead is fed to the pebble mill with the chemicals used in the manufacture, in which mill it is gradually converted by the pulverizing and chemical action into a white lead ultimately being discharged in a continuous manner through the opening 6 in the trunnion 3 to the receiving vessel.

In Figure V I have shown a method and construction of my apparatus for operation producing white lead by my method in batches. The only difference in this form from the form above described is that the tumbling barrel is provided with an opening 38 adapted to be closed by a lid 39 and fastened closed by a clasp 40. In this form the powdered lead bin 14' contains powdered lead 15' which is allowed to flow through a pipe 41 provided with a closure 42 which may be opened and closed. In this form the tumbling barrel 1, preferably sets horizontally the standards 4' and 5' being of equal height and the trunnion 3' not being hollow so as to feed the finished white lead from the tumbling barrel.

In this form the pipe 8 of Figure I is eliminated and a proper quantity of pulverized lead for producing the batch of white lead is fed from the bin 14' through the opening 38 in the tumbling barrel which tumbling barrel may be rotated to bring the opening just below the end of the pipe 41 leading from the bin 14'. By opening the closure 42 at the bottom end of the pipe 41 sufficient powdered lead is allowed to drop into the tumbling barrel to provide the necessary powdered lead for the batch. The closure 42 is then closed and the lid 39 for the opening 38 in the tumbling barrel is then fastened down by the clasp 40 in a securely tight manner so that the tumbling barrel may be rotated without the contents of the tumbling barrel being allowed to pass through the opening when the opening is on the lower side of the tumbling barrel during the rotation of the same.

The carbon-dioxide and superheated steam and if desired, air, water and acetic acid solution may be fed into the inside of the tumbling barrel as in the form shown in Figures I, II, III and IV continuously, or by controlling the valves leading to the respective gases and liquids a sufficient quantity of each may be fed into the inside of the tumbling barrel and then the valves closed and the tumbling barrel further operated either to complete the manufacture of white lead or until it is desired to supply further quantities of the liquids and gases so as to continue the process of completing the batch of white lead. If desired, there may be a small opening leading through the trunnion 3' from the atmosphere into the inside of the tumbling barrel to allow the escape of surplus gases, or other openings may be formed if desired.

After the tumbling mill has been rotated sufficiently long to complete the batch of white lead in the proper quality, which may be ascertained by examination of samples of the white lead as the process continues, the tumbling barrel is stopped with the lid 39 and opening 38 at the bottom of the tumbling barrel over a receiving vessel and the lid then opened to allow the batch of white lead to flow into the receiving vessel. The tumbling barrel may then be rotated until the opening is below the pipe 41 when a new batch of powdered lead may be supplied, the opening closed and the process may then be again carried out.

Except as indicated the apparatus of Figure V is similar to the apparatus shown in Figures I, II, III and IV and corresponding elements not otherwise mentioned bear the same reference characters with the prime (') mark added after each to show that the elements correspond to elements bearing reference characters in Figures I, II, III and IV without the prime (') added.

It is understood that I may provide heaters to heat the acetic acid solution, air and water to be fed to the tumbling barrel if the heating of any or all of these materials are desired to keep up the temperature in the tumbling barrel and make the chemicals more active.

While I have described an illustrative apparatus and method for carrying out my invention I desire it to be understood that the same may be modified and varied from in many particulars without departing from the scope of my invention.

Having thus described my invention, what I claim as new and desire to secure by Letters Patent is:

1. A method of producing white lead which includes subjecting metallic lead to the action of carbon dioxide in an oxidizing atmosphere while avoiding the solution of substantial quantities of said lead, and while grinding the surfaces of said lead and disseminating it into intimate contact with the reacting gases.

2. A step in a method of producing white lead embodying the subjection of metallic lead to the action of superheated steam and carbon dioxide while avoiding the solution of a substantial quantity of said lead.

3. A method of producing white lead which includes subjecting finely divided metallic lead to the action of carbon dioxide and air while avoiding the solution of substantial quantities of lead and continuously removing the surface of said lead exposed to said carbon dioxide and air.

4. A method of producing white lead embodying the subjection of metallic lead to the action of superheated steam, carbon dioxide and water, while avoiding the solution of a substantial quantity of said lead.

5. A process of producing white lead, which comprises oxidizing and corroding particles of metallic lead by the action of superheated steam and carbon dioxide and continuously removing the coating of corroded lead formed on said particles.

6. A process of producing white lead, which comprises oxidizing and corroding lead by the action of superheated steam, carbon dioxide and water and continuously removing the coating of white lead formed on said particles by the action of said gases.

7. A process of producing white lead, which comprises oxidizing and treating metallic lead with superheated steam and carbon dioxide in the presence of acetic acid vapors and continuously removing the film of corroded lead and exposing a fresh surface to said gases.

8. A process for producing white lead which comprises simultaneously oxidizing and subjecting metallic lead to steam and carbon dioxide while avoiding the solution of substantial quantities of lead and continuously bringing particles of lead into contact with a hard moving surface with sufficient pressure to remove the coating of white lead formed on said lead during said treatment.

9. A method of producing white lead embodying the subjection of metallic lead simultaneously to the action of superheated steam, carbon dioxide and acetic acid while avoiding the solution of substantial quantities of said lead.

10. A process of producing white lead, which comprises oxidizing and subjecting finely divided metallic lead to the action of carbon dioxide, air and steam, and continuously removing the corroded surface from said particles.

11. A process of producing white lead, which comprises oxidizing and subjecting finely divided metallic lead to the action of carbon dioxide, air and steam, and removing the corroded surface from said particles.

12. A process of producing white lead which comprises oxidizing and exposing metallic surfaces of lead to the direct action of superheated steam and carbon dioxide in the presence of acid vapors.

13. A process of producing white lead, which comprises oxidizing and exposing metallic surfaces of lead to the direct action of superheated steam and carbon dioxide in the presence of acid vapors, and continuously removing the corroded coating from said lead.

14. A step in a method of producing white lead embodying the subjection of metallic lead to a pulverizing action in the presence of superheated steam and carbon dioxide.

15. A method of producing white lead embodying the subjection of finely divided metallic lead to a pulverizing action in the presence of steam and carbon dioxide, in the presence of acetic acid vapors and an oxidizing agent.

16. A process of producing white lead, which comprises subjecting particles of lead to the action of an oxidizing agent, steam and carbon dioxide, continuously removing the coating of corroded lead from said particles and continuously removing said corroded lead from the presence of said steam and carbon dioxide.

17. A method of producing white lead embodying the subjection of finely divided metallic lead to the action of a pebble pulverizing mill in the presence of an oxidizing agent, superheated steam and carbon dioxide.

18. A method of producing white lead embodying the continuous feeding of carbon dioxide, an oxidizing agent, a steam and powdered lead to the interior of a pebble mill and the continuous rotation of the pebble mill to simultaneously pulverize and convert the lead into white lead, the latter when produced continuously flowing from the pebble mill.

In testimony whereof, I affix my signature.

CHESTER H. BRASELTON.